: US 8,314,827 B2
(45) Date of Patent: Nov. 20, 2012

(12) United States Patent
Mihara et al.

(54) IMAGE FORMING APPARATUS WITH OPTICAL SCANNER

(75) Inventors: Jun Mihara, Aichi (JP); Taizo Matsuura, Ama (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 77 days.

(21) Appl. No.: 13/044,627

(22) Filed: Mar. 10, 2011

(65) Prior Publication Data
US 2011/0292158 A1 Dec. 1, 2011

(30) Foreign Application Priority Data

May 28, 2010 (JP) ................................. 2010-123188

(51) Int. Cl.
*B41J 15/14* (2006.01)
*B41J 27/00* (2006.01)
(52) U.S. Cl. ........................................ 347/242; 347/257
(58) Field of Classification Search .................. 347/242, 347/244, 245, 257, 258, 263
See application file for complete search history.

(56) References Cited

U.S. PATENT DOCUMENTS 7,474,451 B2 * 1/2009 Yamakawa et al. ........ 359/216.1
2011/0199664 A1 * 8/2011 Serizawa et al. ........... 359/205.1

FOREIGN PATENT DOCUMENTS

| JP | 03-259107 A | 11/1991 |
| JP | 11-249056 A | 9/1999 |
| JP | 2000-280519 A | 10/2000 |
| JP | 2005-062892 A | 3/2005 |
| JP | 2005-181501 A | 7/2005 |
| JP | 2008-070580 | 3/2008 |

OTHER PUBLICATIONS

JP Decision of Grant for Patent dtd Apr. 17, 2012, JP Appln. 2010-123188, English translation.

* cited by examiner

*Primary Examiner* — Hai C Pham
(74) *Attorney, Agent, or Firm* — Banner & Witcoff, Ltd.

(57) ABSTRACT

In a scanner housing of an optical scanner fixed to a main body housing of an image forming apparatus, an opposite wall is disposed between a support wall on which an optical element is supported and a wall of the main body housing. A space at an extreme end of an inner projection has a distance smaller than distances at all other spaces between the support wall and the opposite wall. A space at an extreme end of an outer projection has a distance smaller than distances at all other spaces between the wall of the main body housing and the opposite wall. The space at the extreme end of the inner projection overlaps with the space at the extreme end of the outer projection as viewed from a direction in which the inner projection and the outer projection project.

8 Claims, 7 Drawing Sheets

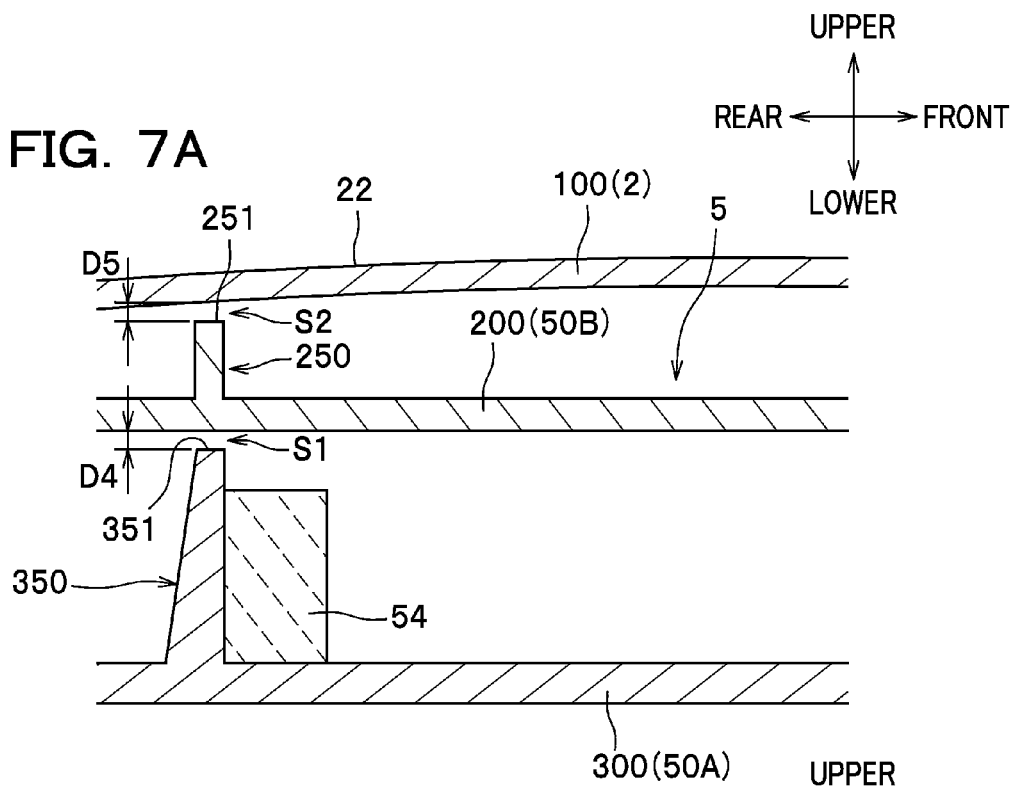
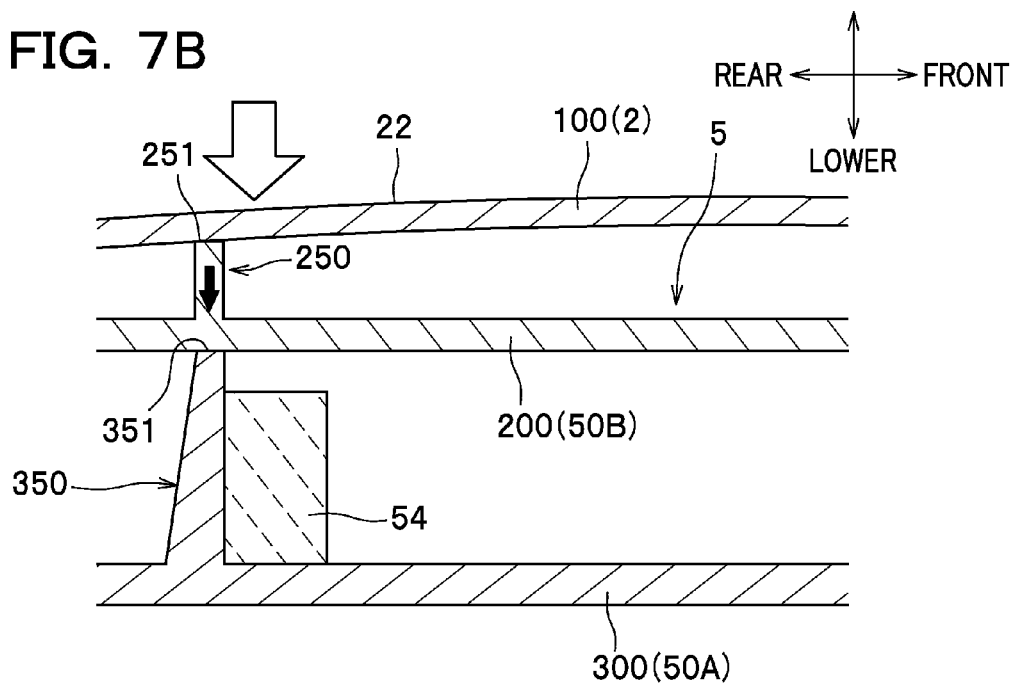

IMAGE FORMING APPARATUS WITH OPTICAL SCANNER

CROSS-REFERENCE TO RELATED APPLICATION(S)

This application claims priority from Japanese Patent Application No. 2010-123188 filed on May 28, 2010, the disclosure of which is incorporated herein by reference in its entirety.

FIELD

The present invention relates to an image forming apparatus with an optical scanner.

BACKGROUND

In general, an image forming apparatus such as a laser printer includes an optical scanner for exposing a peripheral surface of a photoconductor drum to light. The optical scanner typically includes a light source (light source unit), optical elements such as a polygon mirror, an fθ lens and a folding mirror, and a scanner housing in which these optical elements and other components are housed.

The recent trend in the design of the image forming apparatus toward miniaturization involves downsizing of the optical scanner. Hence, in the image forming apparatus appearing on the market in recent years, clearances left between each optical element and the wall of the scanner housing, as well as between the wall of the scanner housing and the main body housing of the image forming apparatus, are designed to be very small.

In the image forming apparatus of this design, if a great force is applied from outside, for example, to a sheet output tray formed on the top side of the main body housing, or the like, the wall of the main body housing is deformed and undesirably pressed against the wall of the scanner housing which may in turn become deformed. Deformation of the wall of the scanner housing would possibly cause the optical elements to be shifted from its original position. This would make it difficult to precisely expose the photoconductor drum to light in all likelihood, and resultantly lower the quality of images to be formed.

There is a need to provide an image forming apparatus such that deterioration of the quality of images formed therein can be suppressed.

SUMMARY

In one aspect, there is provided an image forming apparatus comprising a main body housing, a photoconductor and an optical scanner. The optical scanner is fixed to the main body housing and configured to scan the photoconductor with a light beam. The optical scanner includes a light source configured to emit the light beam, an optical element configured to cause the light beam emitted from the light source to form an image on the photoconductor, and a scanner housing in which the optical element is housed. The scanner housing includes a support wall on which the optical element is supported, an opposite wall disposed between the support wall and a wall of the main body housing, the opposite wall having one side facing to the support wall and another side facing to the wall of the main body housing, and an inner projection provided between the support wall and the opposite wall, projecting from at least one of the support wall and the opposite wall, and having an extreme end at which a space between the support wall and the opposite wall has a distance that is smaller than distances at all other spaces between the support wall and the opposite wall. The image forming apparatus further comprises an outer projection provided between the wall of the main body housing and the opposite wall of the scanner housing, projecting from at least one of the wall of the main body housing and the opposite wall of the scanner housing, and having an extreme end at which a space between the is wall of the main body housing and the opposite wall of the scanner housing has a distance that is smaller than distances at all other spaces between the wall of the main body housing and the opposite wall of the scanner housing. The space at the extreme end of the inner projection overlaps with the space at the extreme end of the outer projection as viewed from a direction in which the inner projection and the outer projection project.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIG. 7A schematically shows an enlarged section of an optical scanner configured according to another embodiment in which an inner projection is embodied as a wall configured to allow the scan lens to be fixed thereto;

FIG. 7B shows the state of the optical scanner of FIG. 7A to which an external force is applied.

DESCRIPTION OF EMBODIMENTS

First Embodiment

Figure 1:
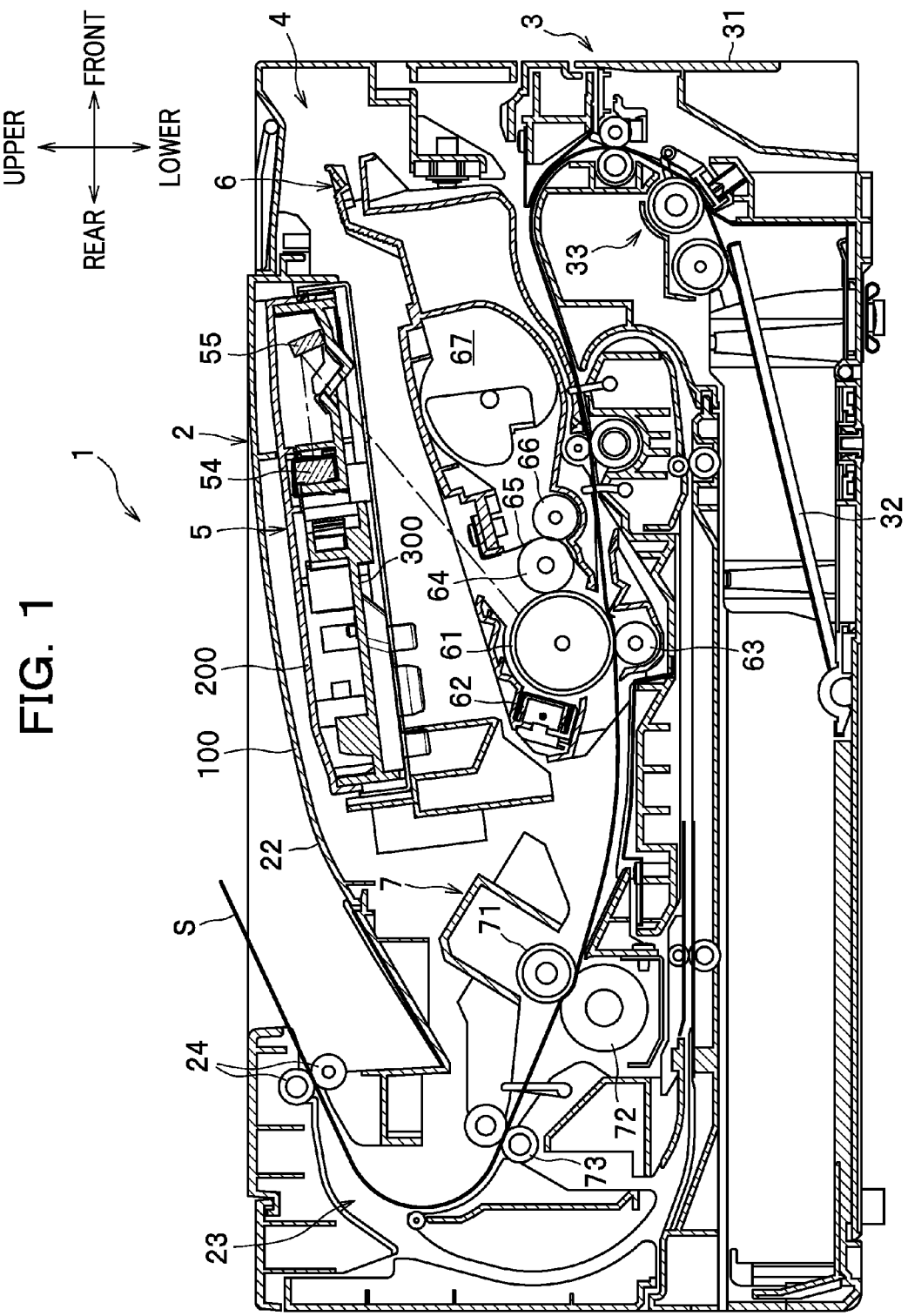
FIG. 1 is a schematic diagram of a laser printer as one example of an image forming apparatus according to an illustrative embodiment.

A detailed description will be given of a first embodiment of the present invention with reference made to the drawings where appropriate. In the following description, a general setup of an image forming apparatus (laser printer) according to the present embodiment will be described at the outset, and then structural features of the present embodiment will be described in detail.

Hereinbelow, in describing the arrangement and operation of each component in the laser printer 1, the direction is designated as from the viewpoint of a user who is using (operating) the laser printer 1. To be more specific, in FIG. 1, the right-hand side of the drawing sheet corresponds to the "front" side of the printer, the left-hand side of the drawing sheet corresponds to the "rear" side of the printer, the front side of the drawing sheet corresponds to the "left" side of the printer, and the back side of the drawing sheet corresponds to the "right" side of the printer. Similarly, the direction of a line extending from top to bottom of the drawing sheet corresponds to the "vertical" or "up/down (upper/lower or top/bottom)" direction of the printer.

<General Setup of Laser Printer>

As shown in FIG. 1, a laser printer 1 as one example of an image forming apparatus comprises a main body housing 2, and several components housed within the main body housing 2 which principally include a sheet feeder unit 3 for feeding a sheet S (e.g., of paper) as one example of a recording sheet, and an image forming unit 4 for forming an image on the sheet S.

The main body housing 2 is configured such that an optical scanner 5 and a fixing device 7 as will be described later are fixed thereto, and a sheet feed tray 31 and a process cartridge 6 as will be described below are detachably attached thereto. Among walls making up the main body housing 2, a top wall 100 is configured as a sheet output tray 22 of which an upper surface serves to receive a recording sheet S outputted from the main body housing 2.

The sheet feeder unit 3 is disposed in a lower space inside the main body housing 2, and principally includes a sheet feed tray 31, a sheet pressure plate 32 and a sheet conveyor mechanism 33. In the sheet feeder unit 3, sheets S in the sheet feed tray 31 are pressed upwardly by the sheet pressure plate 32, and each sheet S separated from the others is conveyed by the sheet conveyor mechanism 33 into the image forming unit 4.

The image forming unit 4 principally includes an optical scanner 5, a process cartridge 6, and a fixing unit 7.

The optical scanner 5 is disposed in an upper space inside the main body housing 2, and configured to emit a laser beam (see alternate long and short dashed lines) regulated according to image data and to scan (illuminate) a peripheral surface of the photoconductor drum 61 with the laser beam. A detailed description of the optical scanner 5 will be given later.

The process cartridge 6 is disposed under the optical scanner 5, and configured to be installable in and removable from the main body housing 2 through an opening which is formed when a front cover (not designated by reference numeral) provided at the main body housing 2 is swung open. The process cartridge 6 principally includes a photoconductor drum 61, a charger 62, a transfer roller 63, a developing roller 64, a doctor blade 65, a supply roller 66, and a toner reservoir 67 for storing toner (developer).

In the process cartridge 6, the peripheral surface of the photoconductor drum 61 is uniformly charged by the charger 62, and then exposed to a laser beam from the optical scanner 5, so that an electrostatic latent image corresponding to the image data is formed on the peripheral surface of the photoconductor drum 61. Toner in the toner reservoir 67 is supplied via the supply roller 66 onto the developing roller 64, and passes through between the developing roller 64 and the doctor blade 65, so that a thin layer of toner having a predetermined thickness is carried on the developing roller 64.

The toner carried on the developing roller 64 is supplied from the developing roller 64 to the electrostatic latent image formed on the peripheral surface of the photoconductor drum 61. In this way, the electrostatic latent image is visualized and a toner image is formed on the peripheral surface of the photoconductor drum 61. Thereafter, a sheet S is conveyed through between the photoconductor drum 61 and the transfer roller 63, so that the toner image carried on the photoconductor drum 61 is transferred onto the sheet S.

The fixing unit 7 is disposed rearwardly of the process cartridge 6, and principally includes a heating roller 71 and a pressure roller 72 disposed opposite to the heating roller 71 to be pressed against the heating roller 71. In the fixing unit 7, the toner image transferred on the sheet S is thermally fixed on the sheet S while passing through between the heating roller 71 and the pressure roller 72. The sheet S with the toner image thermally fixed thereon is conveyed by conveyor rollers 73 along a sheet conveyor path 23 and ejected out from the sheet conveyor path 23 onto the sheet output tray 22 by output rollers 24.

<Detailed Structure of Optical Scanner>

Figure 2:
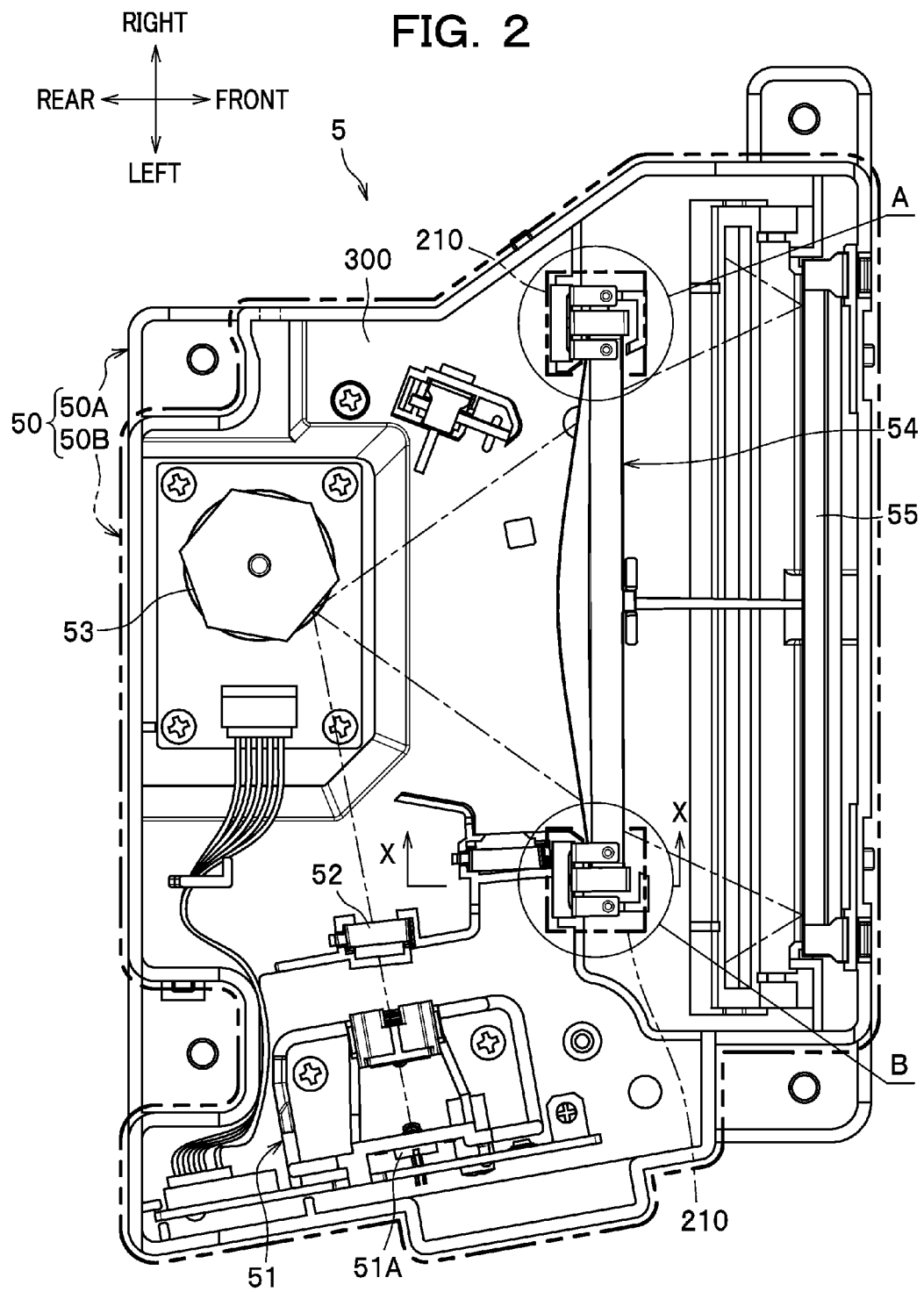
FIG. 2 is a plan view of an optical scanner.

As shown in FIG. 2, the optical scanner 5 comprises a scanner housing 50, and several components housed within the scanner housing 50 which principally include a light source device 51, a cylindrical lens 52 configured to cause laser light (light beam) emitted from the light source device 51 to form an image on the photoconductor drum 61, a polygon mirror 53, a scan lens 54 as one example of an optical element, and a reflecting mirror 55.

The light source device 51 includes several components such as a semiconductor laser 51A as one example of a light source configured to emit a light beam and a coupling lens (not shown) configured to collimate (convert) the laser beam emitted from the semiconductor laser 51A into a parallel or nearly parallel beam.

The cylindrical lens 52 is disposed to allow a laser beam emitted from the light source device 51 to pass therethrough and travel toward the polygon mirror 53. The cylindrical lens 52 is configured to refract the laser beam emitted from the light source device 51 to converge it in the sub-scanning direction (perpendicular to the main scanning direction) on the polygon mirror 53 (reflecting surfaces thereof).

The polygon mirror 53 is shaped generally like a hexagonal column with six sides consisting of reflecting surfaces. The polygon mirror 53 spins at high speed and reflects a laser beam from the light source device 53 to cause the laser beam to change its direction along the main scanning direction (lateral direction) so that the laser beam sweeps with constant angular velocity.

The scan lens 54 is long in the main scanning direction and configured as a scan lens through which the laser beam caused to change its direction and sweep by the polygon mirror 53 travels. In the scan lens 54, the laser beam caused to sweep with constant angular velocity by the polygon mirror 53 is converted into a laser beam which sweeps with constant linear velocity, and converged on the peripheral surface of the photoconductor drum 61, so as to correct an optical face tangle error of the polygon mirror 53.

The reflecting mirror 55 is configured to reflect the laser beam which has passed through the scan lens 54 toward the photoconductor drum 61 (see also FIG. 1).

In this optical scanner 5, a laser beam regulated according to image data and emitted from the light source device 51 reflects off or passes through the components, i.e., cylindrical lens 52, polygon mirror 53, scan lens 54 and reflecting minor 55, in this order, so that the peripheral surface of the photoconductor drum 61 (see FIG. 1) is rapidly scanned with the laser beam. In this way, the peripheral surface of the photoconductor drum 61 is exposed to light and an electrostatic latent image based on the image data is formed on the peripheral surface of the photoconductor drum 61.

The scanner housing 50 is a housing configured to house several components such as the light source device 51 and the scan lens 54, and principally includes a base frame 50A shaped like an open-top box and a lid frame 50B configured to be attached to the base frame 50A from above so that the open top of the base frame 50A is covered with the lid frame 50B.

The base frame 50A provides a bottom wall of the scanner housing 50, and principally includes a support wall 300 configured to support the light source device 51, the scan lens 54, etc. and a frame-like surrounding sidewall 50E raised from the peripheral edge of the support wall 300. The lid frame 50B provides a top wall of the scanner housing 50, and principally includes an opposite wall 200 which is disposed such that when the optical scanner 5 is fixed to the main body housing 2, the opposite wall 200 is located between the support wall 300 of the scanner housing 50 and a top wall 100 of the main body housing 2, with one side facing to the support wall 300 and the other side facing to the top wall 100 of the main body housing 2 (see FIG. 1).

<Detailed Structure of Scanner Housing and Main Body Housing>

Next, a detailed structure of the scanner housing 50 and the main body housing 2 will be described hereafter.

Figure 4:
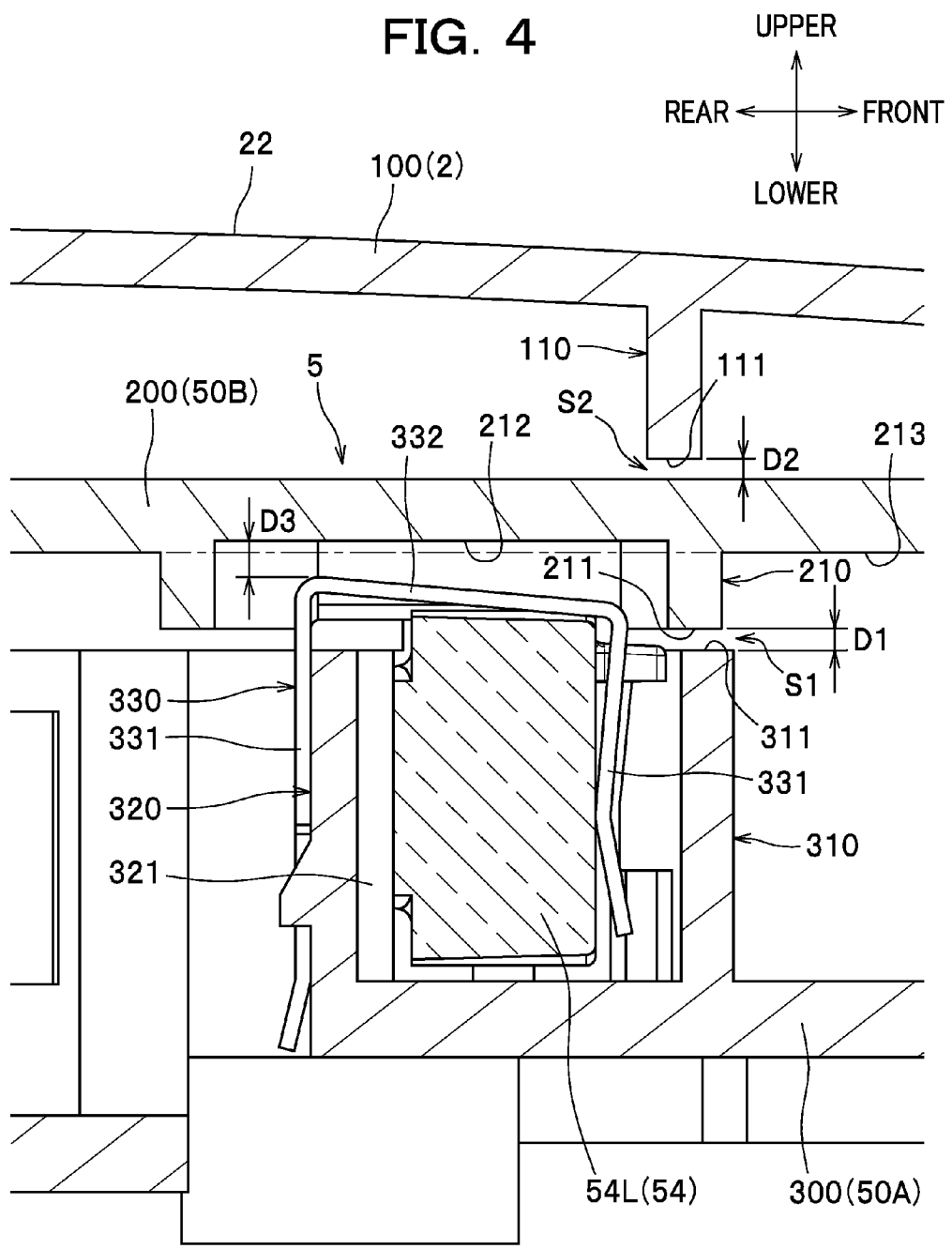
FIG. 4 is an enlarged sectional view of the optical scanner taken along line X-X of FIG. 2.

As shown in FIG. 4, between the support wall 300 and the opposite wall 200, a first inner projection 310 and a second inner projection 210 which in combination serve as "an inner projection" of the present embodiment are provided.

The first inner projection 310 is a wall-like portion provided at the support wall 300 and projecting from the inner side (upper surface) of the support wall 300 toward the opposite wall 200. The second inner projection 210 is a wall-like portion provided at the opposite wall 200 and projecting from the inner side (undersurface) of the opposite wall 200 toward the support wall 300 (i.e., toward the first inner projection 310 provided thereat).

An upper end 311 (extreme end) of the first inner projection 310 and a lower end 211 (extreme end) of the second inner projection 210 have an overlapped region at which the both ends 311, 211 face to each other as viewed from an upward/downward direction. A first space S1 between the support wall 300 (including the first inner projection 310) and the opposite wall 200 (including the second inner projection 210) at that overlapped region has a dimension in the upward/downward direction (distance D1) which is smaller than distances in the upward/downward direction at all other spaces between the support wall 300 and the opposite wall 200.

Between the top wall 100 of the main body housing 2 and the opposite wall 200 of the scanner housing 50, an outer projection 110 is provided which projects from the top wall 100 toward the opposite wall 200 (downward). The outer projection 110 is shaped like a long wall having its length oriented in a right/left direction, and a second space S2 at its lower end 111 (extreme end) between the top wall 100 (including the outer projection 110) and the opposite wall 200 has a dimension in the upward/downward direction (distance D2; i.e., distance between the lower end 111 and the opposite wall 200) which is smaller than distances in the upward/downward direction at all other spaces between the top wall 100 and the opposite wall 200.

The first space S1 (at the ends 311, 211 of the first and second inner projections 310, 210) between the support wall 300 and the opposite wall 200 and the second space S2 (at the end 111 of the outer projection 110 between the top wall 100 and the opposite wall 200 overlap with each other as viewed from the upward/downward direction (i.e., direction in which the first and second inner projections 310, 210 and the outer projection 110 project).

Figure 5:
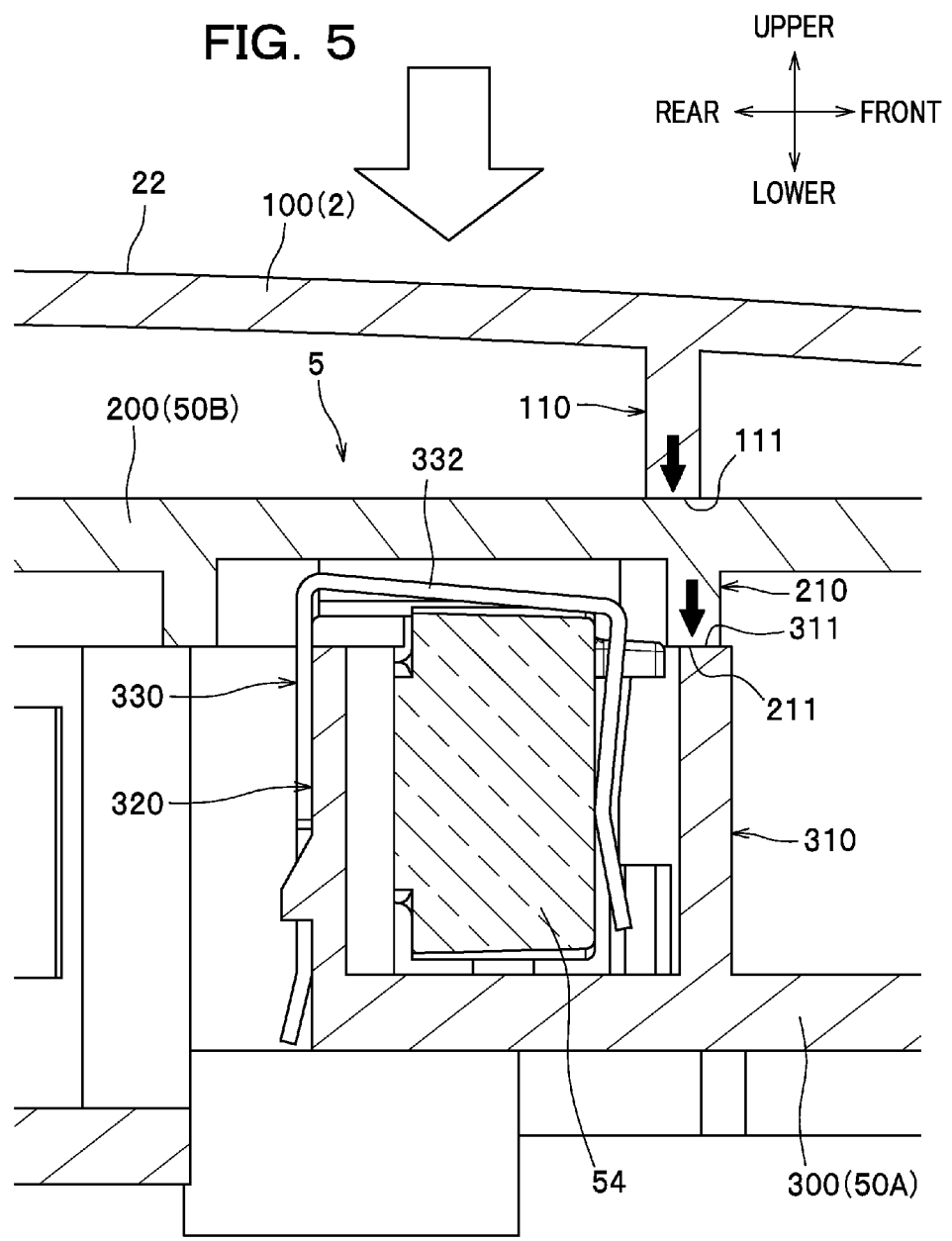
FIG. 5 shows the state of the optical scanner of FIG. 4 to which an external force is applied.

With this configuration, as shown in FIG. 5, when a large external force is applied to the top wall 100 (the sheet output tray 22) of the main body housing 2 (see an outlined arrow) and causes the top wall 100 to deform downward, the lower end 111 of the outer projection 110 comes in contact with the upper surface of the opposite wall 200 before anything else because the distance D2 at the end 111 of the outer projection 110 is the smallest of the distances of spaces between the top wall 100 and the opposite wall 200.

When the lower end 111 of the outer projection 110 pushing the opposite wall 200 causes the opposite wall 200 to deform downward, the lower end 211 of the second inner projection 210 comes in contact with the upper end 311 of the first inner projection 310 because the distance D1 between the ends 311, 211 of the first and second inner projections 310, 210 is the smallest of the distances of spaces between the top wall 100 and the opposite wall 200.

Figure 6A:
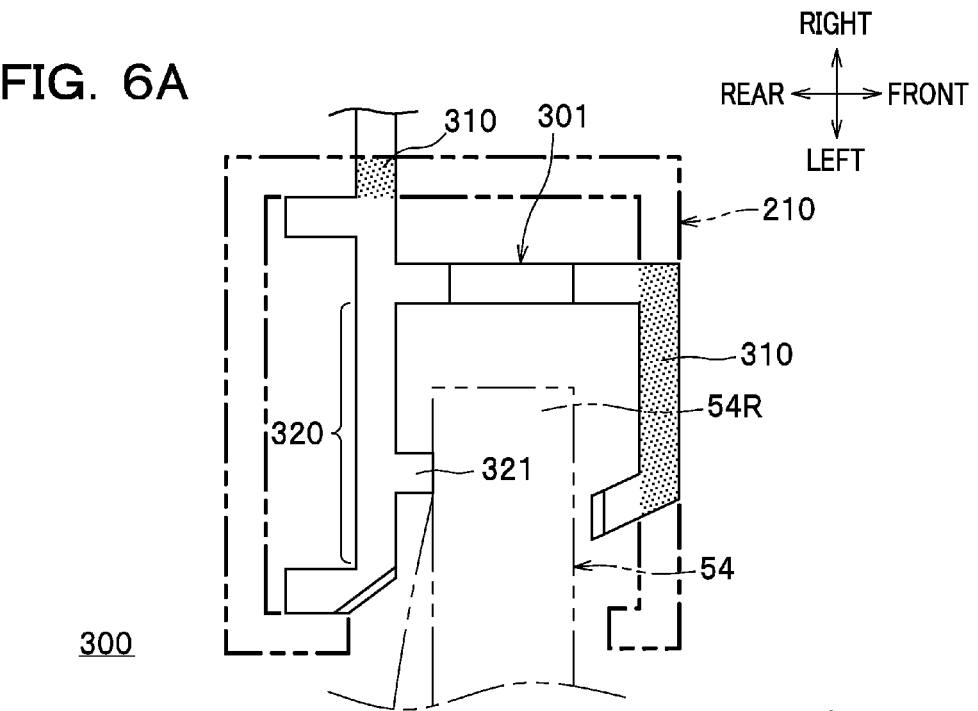
FIG. 6A is an enlarged view of an encircled portion A of the optical scanner of FIG. 2 from which a pinching spring and a scan lens are removed.
Figure 6B:
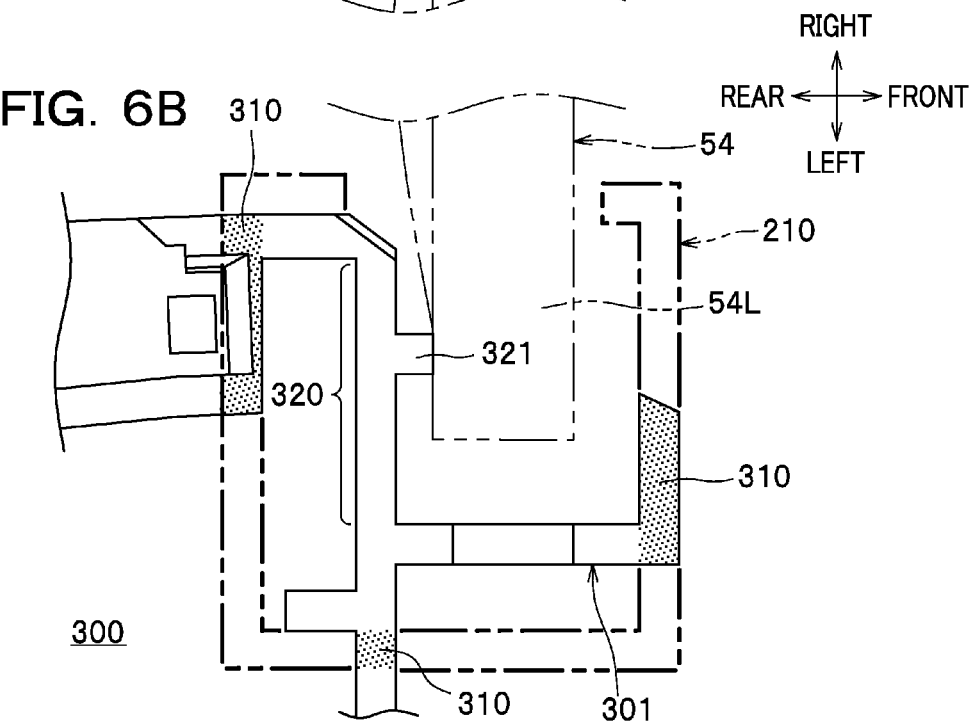
FIG. 6B is an enlarged view of an encircled portion B of the optical scanner of FIG. 2 from which the pinching spring and the scan lens are removed.

A detailed description will now be given of the structural features around the first inner projection 310 and the second inner projection 210. In FIGS. 6A, 6B, the first inner projection 310 (a portion that serves as the "first inner projection") is hatched with dots for the purpose of clearly designating the first inner projection 310.

[Structure of First Inner Projection and Therearound]

As shown in FIGS. 6A and 6B, the support wall 300 includes a first inner projection 310 and an abutment wall 320 disposed near each end portion 54R, 54L of the scan lens 54 (each of portions thereof at both ends in a longitudinal direction of the scan lens 54 oriented in the lateral direction on the support wall 300). To be more specific, each of the first inner projection 310 and the abutment wall 320 is formed as an integral portion of a continuously formed interior wall 301 projecting from the support wall 300. The interior wall 301 is shaped to surround the end portion 54R, 54L of the scan lens 54 on the support wall 300 as viewed from above.

In other words, in the present embodiment, the first inner projection 310 is not an independent member, but the relevant portion of the interior wall 301 is configured to serve as the first inner projection 310 when a large force is applied from outside to the sheet output tray 22.

The abutment wall 320 as an integral portion of the interior wall 301 extends toward the opposite wall 200 (upward), and is arranged such that a side of the end portion 54R, 54L of the scan lens 54 facing in the optical axis direction (front/rear direction of the scan lens 54) abuts on the abutment wall 320 when the scan lens 54 is mounted in the base frame 50A. To be more specific, the abutment wall 320 includes a protruding portion 321 protruding frontward from the front surface of the abutment wall 320, and the end face of the protruding portion 321 abuts on the rear side (corresponding to the side from which a laser beam enters the scan lens 54) of the end portion 54R, 54L of the scan lens 54.

The scan lens 54 is fixed to the base frame 50A with a clipping spring 330 as one example of a biasing member provided at each of the end portions 54R, 54L of the scan lens 54. As shown in FIG. 4, the clipping spring 330 is formed of an oblong metal plate bent into a shape having a substantially U-shaped cross section, and includes a pair of opposed pinching portions 331 and a connecting portion 332 that connects ends of the pinching portions 331 at an opposite wall 200 side (the ends pointing to the opposite wall 200 in FIG. 4).

The clipping spring 330 is attached to the base frame 50A and configured to hold the abutment wall 320 and the end portion 54L (or 54R) of the scan lens 54 by the pinching portions 331 applied thereto from the front and rear directions. Since the pinching portions 331 at no load have a dimension such that they are caused to spread out when the clipping spring 330 is applied to clip the abutment wall 320 and the scan lens 54 together, the scan lens 54 is pressed against the abutment wall 320 by the power to return to the original shape when the clipping spring 330 is attached to the base frame 50A. In this way, the scan lens 54 is fixed to the base frame 50A (i.e., the scanner housing 50).

When the clipping spring 330 is attached to the base frame 50A, the connecting portion 332 is located over the abutment wall 320 (interior wall 301) and the scan lens 54. That is, the connecting portion 332 of the clipping spring 330 attached to the base frame 50A is in a position higher than a position of the upper end of the interior wall 301 (i.e., the upper end 311 of the first inner projection 310).

In the present embodiment, the second inner projection 210 is provided which serves to prevent the opposite wall 200 from getting in contact with the connecting portion 332 of the clipping spring 330, when a large force is applied from outside to the sheet output tray 22.

[Detailed Structure of Second Inner Projection]

In the present embodiment, the second inner projection 210 projects toward the support wall 300 to such an extent that the distance D1 of the first space S1 between the support wall 300 (the first inner projection 310) and the second inner projection 210 is smaller than the smallest distance D3 between the undersurface (an inside surface 212 to be described later) of the opposite wall 200 and the connecting portion 332 of the clipping spring 330. With this configuration, even when a large force is applied from outside to the sheet output tray 22 and causes the opposite wall 200 to deform, it is possible to bring the second inner projection 210 and the first inner projection 310 into contact with each other before anything else.

Figure 3:
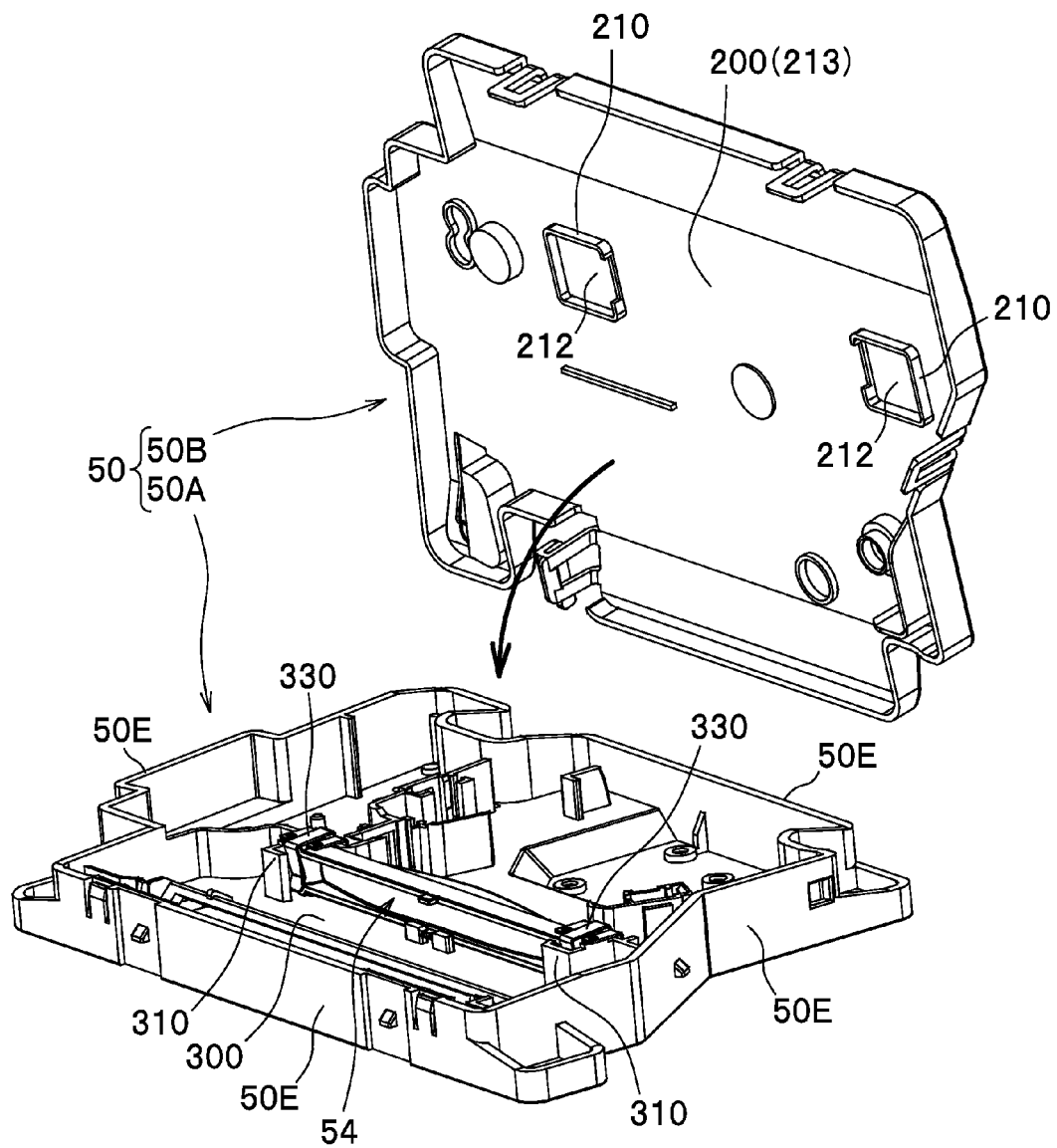
FIG. 3 is a perspective view of a scanner housing with a base frame and a lid frame as detached from the base frame.

As shown in FIG. 3, the second inner projection 210 is shaped substantially like a letter C. To be more specific, as shown in FIGS. 2, 6A and 6B, the second inner projection 210 is provided to surround each of the end portions 54R, 54L of the scan lens 54 as viewed from the direction (the upward/downward direction) in which the second inner projection projects when the lid frame 50B is attached to the base frame 50A.

The opposite wall 200 is, as shown in FIG. 4, configured such that a region (the inside surface 212) of the side thereof facing to the support wall 300 surrounded by the second inner projection 210 is recessed away from the support wall 300 (i.e., upward) relative to a region (an outside surface 213) outside the second inner projection 210. With this configuration, when the opposite wall 200 is caused to deform, the opposite wall 200 (the inside surface 212) can be restricted from getting in contact with the clipping spring 330 (the connecting portion 332).

The present embodiment as described above has several advantageous effects as follow.

Since the first space S1 and the second space S2 (at the ends 311, 211 of the first and second inner projections 310, 210 between the support wall 300 and the opposite wall 200), and the second space S2 (at the end 111 of the outer projection 110 between the top wall 100 and the opposite wall 200) overlap with each other as viewed from the direction (upward/downward direction) in which the first and second inner projections 310, 210 and the outer projection 110 project, as shown in FIG. 5, a large force which may be applied from outside to the sheet output tray 22, first, causes the lower end 111 of the outer projection 110 to come in contact with the opposite wall 200, and then causes the lower end 211 of the second inner projection 210 to come in contact with the upper end 311 of the first inner projection 310. With this configuration, any undesirable contact (interference) of the opposite wall 200 with the scan lens 54 can be suppressed. As a result, a shift in the position or the like of the scan lens 54 can be suppressed, and deterioration of the image quality can be prevented.

Since the second inner projection 210 projecting toward the first inner projection 31 is provided at the opposite wall 200, though part of the clipping spring 330 (the connecting portion 332) is located in a position higher than a position of the upper end 311 of the first inner projection 310, a large force which may be applied from outside to the sheet output tray 22 may cause the opposite wall 200 to deform but will never cause the opposite wall 200 to interfere with the clipping spring 330. As a result, a shift in the position or the like of the scan lens 54 can be suppressed, and thus the deterioration of the image quality can be prevented without fail.

In particular, in the present embodiment, the region (the inside surface 212) of the side of the opposite wall 200 facing to the support wall 300 surrounded by the second inner projection 210 is recessed away from the support wall 300 relative to the region outside the second inner projection 210, and thus the interference of the opposite wall 200 with the clipping spring 330 can be prevented without fail. Furthermore, this configuration makes it possible to provide a sufficient rigidity with a thinly formed opposite wall 200, and thus the optical scanner 5 can be designed to be compact in size.

Since the first inner projection 310 and the abutment wall 320 are configured as continuously formed walls 301, the rigidity of the base frame 50A (the scanner main body 50) can be improved. Consequently, the deformation of the scanner housing 50 which may be caused by external force applied to the sheet output tray 22 can be suppressed, and thus the interference with the scan lens 54 can be prevented.

The present invention is advantageously applicable particularly to a specific configuration in which the wall of the main body housing 2 to which one side of the opposite wall 200 faces is the top wall 100 of which the upper surface is configured as the sheet output tray 22. The reason is: with this configuration, for example, a user may place his/her hand, and rest his/her weight, on the sheet output tray; thus, it is likely that a load (large force) happens to be applied to that wall (top wall 100) of the main body housing 2.

In the above-described embodiment, the first inner projection 310 and the abutment wall 320 that are configured as continuously formed walls 301 are illustrated by way of example. However, the present invention is not limited to this specific configuration. For example, the inner projection and the abutment wall may be formed independently.

In the above-described embodiment, the opposite wall 200 having the side of which the region (inside surface 212) surrounded by the second inner projection 210 is recessed away from the support wall 300 relative to the region (outside surface 213) outside the second inner projection 210 is illustrated by way of example, but the present invention is not limited to this specific configuration; for example, the inside and outside of the side of the opposite wall 200 surrounded by the second inner projection 210 may be configured to be in one and the same plane. In this alternative configuration, the second inner projection 210 (see FIG. 4) is formed such that the distance D1 of the first space S1 between the ends of the first and second projections 310, 320 is smaller than the minimum distance in the upward/downward direction between the outside surface 213 of the opposite wall 200 and the connecting portion 332 of the clipping spring 330.

In the above-described embodiment, the scan lens 54 fixed to the base frame 50A (the support wall 300) with the clipping spring 330 (biasing member) is illustrated by way of example, but the present invention is not limited to this specific configuration. For example, the scanning lens may be fixed to the support wall using an adhesive or the like.

In the above-described embodiment, the inner projection (composed of first and second inner projections 310, 210) provided to project from the both of the support wall 300 and the opposite wall 200 is illustrated by way of example, but the present invention is not limited to this specific configuration; that is, the inner projection may be provided only at the support wall, or provided only at the opposite wall. In the above-described embodiment, the outer projection 110 provided only at the top wall 100 is illustrated by way of example, but the present invention is not limited to this specific configuration; that is, the outer projection may be provided only at the opposite wall, or provided at the both of the top wall and the opposite wall.

Second Embodiment

A second embodiment of the present invention will now be described briefly. In describing the present embodiment, the same elements as those of the first embodiment are designated by the same reference numerals, and a duplicate description is omitted.

As shown in FIG. 7A, an inner projection 350 is provided between the support wall 300 and the opposite wall 200 of the optical scanner 5, and an outer projection 250 is provided between the opposite wall 200 of the optical scanner 5 and the top wall 100 of the main body housing 2.

The inner projection 350 is provided at the support wall 300. To be more specific, the inner projection 350 projects from the support wall 300 toward the opposite wall 200, and has an upper end 351 (extreme end) at which a first space S1 between the upper end 351 and the opposite wall 200 has a distance D4 that is smaller than distances at all other spaces between the support wall 300 and the opposite wall 200.

This inner projection 350 is provided at each of end portions of the scan lens 54 in the longitudinal direction thereof (the right/left direction). The scan lens 54 is located with its end portion abutting on a front surface of the corresponding inner projection 350 and fixed with an adhesive or the like to the front surface of the inner projection 350 or the upper surface (side) of the support wall 300. In other words, the inner projection 350 serves also as a wall configured to allow the scan lens (optical element) to be fixed thereto (or supported thereon).

In the present embodiment, the upper end 351 of the inner projection 350 is in a position higher than a position of the uppermost position of the scan lens 54 when the optical scanner 5 is mounted to the main body housing 2 (see FIG. 1).

The outer projection 250 is provided at the opposite wall 200. To be more specific, the outer projection 250 is configured to project upward from the outer side (upper surface) of the opposite wall 200 toward the top wall 100, and a second space S2 at the upper end 250 (extreme end), i.e., between the upper end 250 and the opposite wall 200, has a distance (the minimum distance D5 of the second space S2) smaller than all other distances between the top wall 100 and the opposite wall 200.

With this configuration, as shown in FIG. 7B, a large force which may be applied from outside to the sheet output tray 22, first causes the top wall 100 to come in contact with the upper end 251 of the outer projection 250, and then causes the opposite wall 200 to come in contact with the upper end 351 of the inner projection 350. As a result, the interference of the opposite wall 200 with the scan lens 54 can be suppressed, and thus deterioration of the image quality can be prevented.

In the present embodiment, the inner projection 350 serve as a wall to which the optical element is fixed, and thus the necessity to provide the abutment wall 320 as in the first embodiment described above can be obviated. Consequently, the structure of the base frame 50A (i.e., the scanner housing 50) can be simplified.

In the illustrated configuration where the sheet output tray 22 is formed at the upper surface of the top wall 100, the inner projection 350 is provided on the support wall 300 which is located in a position lower than that of the opposite wall 200, and the outer projection 250 provided on the opposite wall which is located in a position lower than that of the top wall 100; therefore, it is ensured that deformation of the upper wall located in an upper (higher) position can be received by the projections 350, 250. Supposing that either of inner and outer projections is provided on the upper wall (located in the higher position) of the two walls between which the corresponding projection is provided, deformation of the upper wall would cause the inner or outer projection with its extreme end pointing obliquely downward to come in contact with the lower wall, and thus the lower wall could possibly fail to sufficiently receive the force from outside and adequately support the projection. With this in view, in the present embodiment, the both of the inner and outer projections 350, 250 are provided on the lower walls located in the lower positions respectively, so that the force from outside can be received and supported without fail. As a result, interference of the opposite wall 200 with the scan lens 54 can be prevented.

Although the illustrative embodiments of the present invention have been described above, the present invention is not limited to the above-described embodiments. Various modifications and changes may be made to the specific structures and arrangement without departing from the scope of the present invention.

In the above-described embodiments, the photoconductor drum 61 is adopted as an example of a photoconductor, but the photoconductor applicable is not limited thereto. For example, a photoconductor belt may be adopted, instead.

In the above-described embodiments, the semiconductor laser 51A is adopted as an example of a light source, but the light source applicable is not limited thereto. For example, a solid-state laser such as YAG laser may be adopted, instead.

In the above-described embodiments, the light source device 51 is configured to convert a laser beam (light beam) into a parallel or nearly parallel beam which is to be emitted therefrom, but the present invention is not limited to this specific configuration. For example, a light source device configured to emit converging or diverging beam of light may alternatively be applicable.

In the above-described embodiments, the long-length scan lens 54 is adopted as an example of an optical element, but the optical element applicable is not limited thereto. It is to be understood that the optical element consistent with the present invention may be of any type as long as it is capable of causing the light beam emitted from the light source to form an image on the photoconductor; accordingly, the optical element may be an element which deflects and sweeps a light beam for scanning a photoconductor with the light beam, an element which converge (condense or focus) a light beam, or an element which reflects a light beam. For example, the cylindrical lens 52, the polygon mirror 53, the reflecting mirror 55 as in the above-described embodiments may be arranged in a manner consistent with the present invention.

Instead of the polygon mirror 53, a vibrating mirror which vibrates to deflect and sweep a light beam for scanning a photoconductor with the light beam may be introduced in an alternative embodiment, and such a vibrating mirror may be an optical element consistent with the present invention. Any other optical component which may be provided to direct a light beam from the light source to an accurate position on the photoconductor to properly form a desired image thereon may be considered as consistent with the present invention, such as, a reflecting mirror shown without reference numeral in FIG. 2 which is configured to reflect a laser beam from the polygon mirror 53 toward a beam detector, a lens which is arranged to allow a light beam reflected from the reflecting mirror to pass therethrough before entering the beam detector.

In the above-described embodiments, the top wall 100 makes up the wall of the main body housing 2, but the present invention is not limited to this configuration. For example, a front wall, a rear wall, a right wall or a left wall of the main body housing may be the wall of the main body housing as defined in the appended claims.

In the above-described embodiments, the laser printer 1 is illustrated as an example of an image forming apparatus, but the present invention is not limited to these embodiments. For example, a photocopier, a multifunction peripheral, etc. may be configured in accordance with the present invention.

In the above-described embodiments, a sheet S of paper (which may include ordinary plain paper, cardboard, etc.) is used as an example of a recording sheet. The recording sheet usable in one or more of the embodiments of the present invention may include an OHP sheet, for example.

The invention claimed is:

1. An image forming apparatus comprising:
    a main body housing;
    a photoconductor;
    an optical scanner fixed to the main body housing and configured to scan the photoconductor with a light beam, the optical scanner including a light source configured to emit the light beam, an optical element configured to cause the light beam emitted from the light source to form an image on the photoconductor, and a scanner housing in which the optical element is housed, the scanner housing including a support wall on which the optical element is supported, an opposite wall disposed between the support wall and a wall of the main body housing, the opposite wall having one side facing to the support wall and another side facing to the wall of the main body housing, and an inner projection provided between the support wall and the opposite wall, projecting from at least one of the support wall and the opposite wall, and having an extreme end at which a space between the support wall and the opposite wall has a distance that is smaller than distances at all other spaces between the support wall and the opposite wall; and
    an outer projection provided between the wall of the main body housing and the opposite wall of the scanner housing, projecting from at least one of the wall of the main body housing and the opposite wall of the scanner housing, and having an extreme end at which a space between the wall of the main body housing and the opposite wall of the scanner housing has a distance that is smaller than distances at all other spaces between the wall of the main body housing and the opposite wall of the scanner housing,
    wherein the space at the extreme end of the inner projection overlaps with the space at the extreme end of the outer projection as viewed from a direction in which the inner projection and the outer projection project.

2. The image forming apparatus according to claim 1, wherein
    the optical element includes a long-length scan lens;
    the inner projection includes a first inner projection projecting from the support wall and disposed near an end of the scan lens in a longitudinal direction thereof, and a second inner projection projecting from the opposite wall toward the first inner projection;
    the support wall includes an abutment wall extending toward the opposite wall, wherein an end portion of the scan lens at the end of the scan lens in the longitudinal direction hereof has a side which faces in an optical axis direction and abuts on the abutment wall; and
    the optical scanner further includes a biasing member configured to bias the scan lens toward the abutment wall, the biasing member including a pair of pinching portions configured to hold the abutment wall and the scan lens, and a connecting portion connecting ends of the pinching portions at an opposite wall side.

3. The image forming apparatus according to claim 2, wherein
    the second inner projection is provided to surround the end portion of the scan lens as viewed from the direction in which the second inner projection projects; and
    a region of the one side of the opposite wall facing to the support wall surrounded by the second inner projection is recessed away from the support wall relative to a region outside the second inner projection.

4. The image forming apparatus according to claim 2, wherein the first inner projection and the abutment wall are configured as continuously formed walls.

5. The image forming apparatus according to claim 1, wherein the inner projection includes a wall provided at the support wall and configured to allow the optical element to be fixed thereto.

6. The image forming apparatus according to claim 1, wherein the wall of the main body housing is a top wall of which an upper surface is configured to receive a recording sheet outputted from the main body housing.

7. The image forming apparatus according to claim 6, wherein the inner projection consists of a projection provided at the support.

8. The image forming apparatus according to claim 6, wherein the outer projection consists of a projection provided at the opposite wall.

\* \* \* \* \*